United States Patent
Nakadai et al.

(10) Patent No.: US 10,917,720 B2
(45) Date of Patent: Feb. 9, 2021

(54) SOUND SOURCE LOCALIZATION DEVICE, SOUND SOURCE LOCALIZATION METHOD, AND PROGRAM

(71) Applicant: HONDA MOTOR CO., LTD., Tokyo (JP)

(72) Inventors: Kazuhiro Nakadai, Wako (JP); Shungo Masaki, Tokigawa-machi (JP); Ryosuke Kojima, Wako (JP); Osamu Sugiyama, Kyoto (JP); Katsutoshi Itoyama, Wako (JP); Kenji Nishida, Tsukuba (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/796,173

(22) Filed: Feb. 20, 2020

(65) Prior Publication Data

US 2020/0275200 A1 Aug. 27, 2020

(30) Foreign Application Priority Data

Feb. 27, 2019 (JP) ................................. 2019-034717

(51) Int. Cl.
*H04R 3/00* (2006.01)
*G06N 3/04* (2006.01)
*G06N 20/00* (2019.01)
*H04R 1/40* (2006.01)

(52) U.S. Cl.
CPC .............. *H04R 3/005* (2013.01); *G06N 3/04* (2013.01); *G06N 20/00* (2019.01); *H04R 1/406* (2013.01)

(58) Field of Classification Search
CPC .......... H04R 3/005; H04R 1/406; G06N 3/04; G06N 20/00
See application file for complete search history.

(56) References Cited

U.S. PATENT DOCUMENTS

2014/0044279 A1* 2/2014 Kim .................... G10L 21/0272
381/92

FOREIGN PATENT DOCUMENTS

JP 2008-085472 4/2008

OTHER PUBLICATIONS

Nelson Yalta et al., Sound source localization using deep learning models, Journal of Robotics and Mechatronics, vol. 29, pp. 37-48, 2017, Discussed in specification, English text, 12 pages.
Ryu Takeda et al., Sound Source Localization Based on Deep Neural Networks With Directional Activate Function Exploiting Phase Information, IEEE, pp. 405-409, 2016, English text, 5 pages.

* cited by examiner

*Primary Examiner* — Ping Lee
(74) *Attorney, Agent, or Firm* — Rankin, Hill & Clark LLP

(57) ABSTRACT

A sound source localization device includes an acquisition unit configured to acquire acoustic signals of M channels (M is an integer equal to or greater than one), a phase difference information calculator configured to perform a short-time Fourier transform on the acoustic signals of M channels and to convert a time domain into a frequency domain including phase information, and an estimator configured to input phase information of the acoustic signals subjected to the short-time Fourier transform to a deep learning machine and to perform sound source localization of the acoustic signals using the deep learning machine where input follows a von Mises distribution.

5 Claims, 11 Drawing Sheets

SOUND SOURCE LOCALIZATION DEVICE, SOUND SOURCE LOCALIZATION METHOD, AND PROGRAM

CROSS-REFERENCE TO RELATED APPLICATION

Priority is claimed on Japanese Patent Application No. 2019-034717, filed Feb. 27, 2019, the content of which is incorporated herein by reference.

BACKGROUND OF THE INVENTION

Field of the Invention

The present invention relates to a sound source localization device, a sound source localization method, and a program.

Description of Related Art

Sound source localization is performed using a microphone array composed of a plurality of microphones. An outline of sound source localization processing in the prior art will be described using FIGS. 12 to 14. FIG. 12 is a diagram which shows sound collection using the microphone array. FIG. 13 is a diagram which shows an example procedure of conventional sound source localization processing.

In sound source localization processing, an acoustic signal 902 generated by the sound source 901 is subjected to sound collection using a microphone array 903. As shown in FIG. 12, the microphone array 903 includes a plurality of microphones 903a, 903b, 903c, . . . , and so forth.

As shown in FIG. 12, an arrival time difference (hereinafter, simply referred to as a time difference) occurs in signals received by microphones 903a to 903c. Then, a short-time Fourier transform is performed on the acoustic signal subjected to sound collection in conventional sound source localization to convert a time domain into a frequency domain. According to this conversion, time difference information $\Delta t$ is converted into phase difference information $\Delta \theta$. In sound source localization processing, a sound source direction is obtained using this phase difference information $\Delta \theta$. Here, since phase information is a periodic function as shown in FIG. 14, there are an infinite number of maximum values. FIG. 14 is a diagram which shows an example of the phase difference information.

Furthermore, in sound source localization processing, a sound source direction is estimated using a transfer function from a sound source to each microphone. Estimation accuracy in sound source localization processing depends on this transfer function. In order to obtain the transfer function, for example, an acoustic signal is subjected to sound collection by moving the sound source for each predetermined angle on a circumference of 0 to 360 degrees. When the predetermined angle is smaller, the accuracy can be higher, but measurement effort and an amount of calculation increase. For this reason, improvement in sound source localization performance by performing deep learning of the transfer function is required.

One example in which a neural network is used for speech recognition processing will be described. In speech recognition processing, it is common to input an actual value such as an amplitude spectrum into the neural network. Such an actual value has one maximum value, and is a signal according to, for example, a Gaussian distribution. Japanese Unexamined Patent Application, First Publication No. 2008-85472 (hereinafter, Patent Document 1) discloses a sound source identification device which has a sound source localization unit and a sound source identifier that are configured by a neural network including a plurality of pulse neuron models. Note that a pulse neuron model is a neuron model which uses pulse trains as input/output signals. In addition, in a technology described in Patent Document 1, it has been proposed to improve accuracy in sound source identification by performing learning on a pulse neuron model.

On the other hand, as described above, phase information used for sound source localization is a periodic function. For this reason, as shown in FIG. 15, in the prior art, preprocessing (for example, refer to "Sound source localization using deep learning models," Yalta, N., Nakadai, K., & Ogata, T., 2017, Journal of Robotics and Mechatronics, Vol. 29, p 37-48 (hereinafter, Non-Patent Document 1) and "SOUND SOURCE LOCALIZATION BASED ON DEEP NEURAL NETWORKS WITH DIRECTIONAL ACTIVATE FUNCTION EXPLOITING PHASE INFORMATION," Ryu Takeda and Kazunori Komatani, IEEE, 2016, p 405-409 (hereinafter, Non-Patent Document 2)) is performed with respect to phase processing of collected acoustic signals, and phase information is input to an input layer of a neural network after converting it into non-periodic information. FIG. 15 is a diagram for describing an example of a sound source localization processing technique using a neural network in the prior art.

SUMMARY OF THE INVENTION

In the technology described in Non-Patent Document 1, a complex spectrum is converted into an actual number by preprocessing, and the converted actual number is input to the neural network. In addition, in the technology described in Non-Patent Document 2, an amplitude spectrum is input to the neural network. As described above, in conventional technologies described in Non-Patent Documents 1 and 2, since information other than phase information is input to the neural network, important phase information cannot be utilized for sound source localization processing.

Aspects according to the present invention have been made in view of the problems described above, and an object thereof is to provide a sound source localization device, a sound source localization method, and a program which can perform sound source localization according to deep learning using phase information.

In order to solve the problems described above, the present invention has adopted the following aspects.

(1) A sound source localization device according to one aspect of the present invention includes an acquisition unit configured to acquire acoustic signals of M channels (M is an integer equal to or greater than one), a phase difference information calculator configured to perform a short-time Fourier transform on the acoustic signals of M channels and to convert a time domain into a frequency domain including phase information, and an estimator configured to perform sound source localization of the acoustic signals using the deep learning machine where input follows a von Mises distribution by inputting phase information of the acoustic signals subjected to the short-time Fourier transform to a deep learning machine.

(2) In the aspect (1) described above, the deep learning machine may be a learning machine in which an energy function of a probability model is defined by the following equation (a, b, c, and d are parameters, W and Q are network weight parameters, $v \in [0, 2\pi]^I$, $h \in [0, 2\pi]^J$, I is the total number of nodes in a lower layer (input side), J is the total number of nodes in an upper layer (output side), and T is an inversion code) to construct a neural network.

$$E(v,h) = -a^T \cos(v) - b^T \sin(v)$$

$$-c^T h - (\cos(v)^T W + \sin(v)^T Q) h$$

(3) In the aspect (2) described above, the deep learning machine may define an activation function to which an output of the learning machine is input, which is a posterior probability $P(h_j=1|v)$ in the learning machine, as shown in the following equation ($\sigma(\cdot)$ is a sigmoid function), $$P(h_j = 1|v) = \frac{P(v, h_j)}{P(v)} = \frac{P(v, h_j)}{P(h_j = 0|v) + P(h_j = 1|v)} =$$

$$\frac{\exp\left(a^T \sin v + b^T \cos v + c_j h_j + \sum_i h_j(W_{ij} \sin v_i + Q_{ij} \cos v_i)\right)}{\exp(a^T \sin v + b^T \cos v) + \exp\left(a^T \sin v + b^T \cos v + c_j + \sum_i (W_{ij} \sin v_i + Q_{ij} \cos v_i)\right)} =$$

$$\frac{\exp\left(c_j h_j + \sum_i h_j(W_{ij} \sin v_i + Q_{ij} \cos v_i)\right)}{1 + \exp\left(c_j + \sum_i (W_{ij} \sin v_i + Q_{ij} \cos v_i)\right)} =$$

$$\left(\frac{1}{1 + \exp\left(-\left(c_j + \sum_i (W_{ij} \sin v_i + Q_{ij} \cos v_i)\right)\right)}\right)^{h_j} \times$$

$$\left(1 - \frac{1}{1 + \exp\left(-\left(c_j + \sum_i (W_{ij} \sin v_i + Q_{ij} \cos v_i)\right)\right)}\right)^{1-h_j} =$$

$$p_i^{h_j}(1 - p_i)^{1-h_j}$$

$p_i$ may be the following equation in the above equation, and $$p_i = \frac{1}{1 + \exp\left(-\left(c_j + \sum_i (W_{ij} \sin v_i + Q_{ij} \cos v_i)\right)\right)}$$

the above equation may be expressed as the following equation using the sigmoid function.

$$p_j = \sigma(c_j + \Sigma_i(W_{ij} \sin v_i + Q_{ij} \cos v_i))$$

(4) In any one of the aspects (1) to (3) described above, an output conditional probability $P(h_j|v)$ of the deep learning machine may follow a Bernoulli distribution.

(5) A sound source localization method according to another aspect of the present invention includes an acquisition procedure for acquiring, by an acquisition unit, acoustic signals of M channels (M is an integer equal to or greater than one), a conversion procedure for converting, by a phase difference information calculator, a time domain into a frequency domain including phase information by performing a short-time Fourier transform on the acoustic signals of M channels, and an estimation procedure for performing, by an estimator, sound source localization of the acoustic signals by inputting phase information of the acoustic signals subjected to the short-time Fourier transform to a deep learning machine using the deep learning machine where input follows a von Mises distribution.

(6) A computer readable non-temporary storage medium according to still another aspect of the present invention stores a program causing a computer of a sound source localization device to execute an acquisition procedure for acquiring acoustic signals of M channels (M is an integer equal to or greater than one), a conversion procedure for converting a time domain into a frequency domain including phase information by performing a short-time Fourier transform on the acoustic signals of M channels, and an estimation procedure for performing sound source localization of the acoustic signals by inputting phase information of the acoustic signals subjected to the short-time Fourier transform to a deep learning machine using the deep learning machine where input follows a von Mises distribution.

According to the aspects (1) to (6) described above, it is possible to perform sound source localization according to deep learning using phase information (period information). In addition, according to the aspect (3) described above, it is possible to learn period information using an activation function.

DETAILED DESCRIPTION OF THE INVENTION

In the following description, embodiments of the present invention will be described with reference to the drawings.

Figure 1:
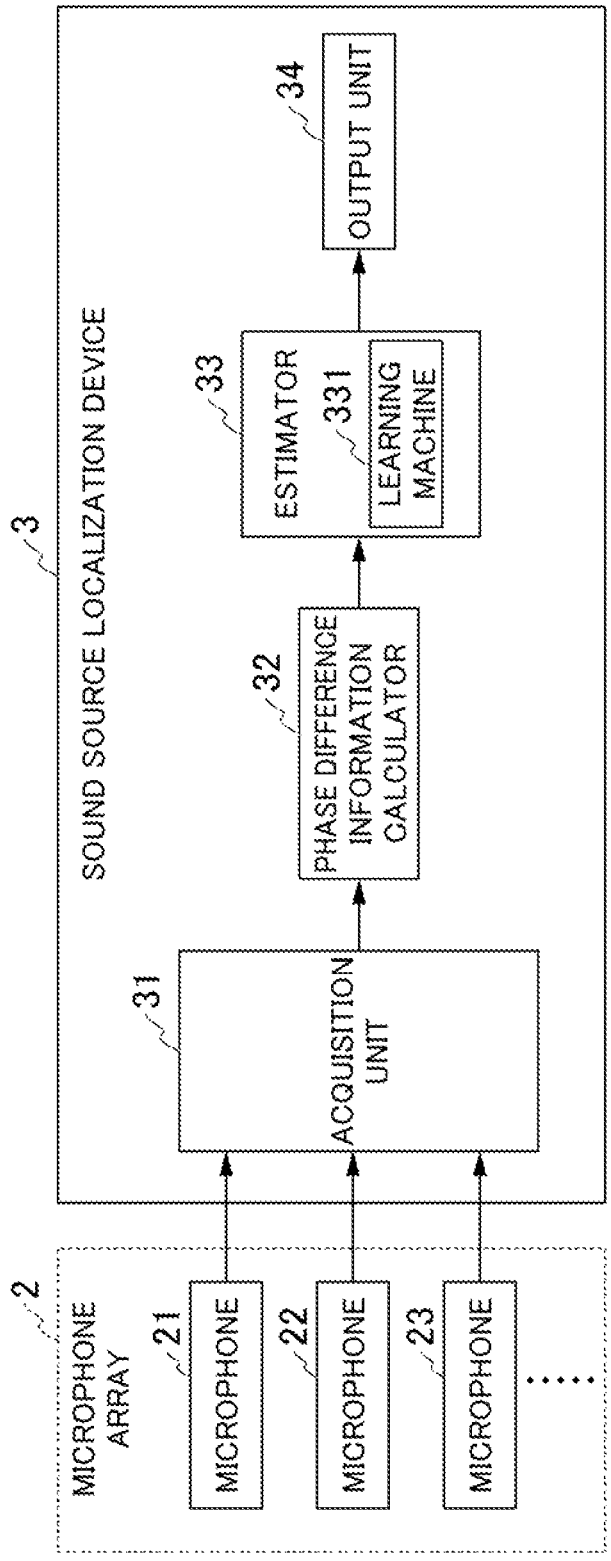
FIG. 1 is a block diagram which shows a configuration example of a sound source localization device according to an embodiment.

FIG. 1 is a block diagram which shows a configuration example of a sound source localization device 3 according to the present embodiment. As shown in FIG. 1, the sound source localization device 3 includes an acquisition unit 31, a phase difference information calculator 32, an estimator 33, and an output unit 34. A microphone array 2 is connected to the sound source localization device 3 in a wireless or wired manner.

The microphone array 2 includes M (M is an integer of two or more) microphones (microphones 21, 22, 23, ..., and so forth). The microphone array 2 collects acoustic signals emitted by a sound source and outputs the collected acoustic signals of M channels to the sound source localization device 3.

The sound source localization device 3 estimates a direction of the sound source using the acquired acoustic signals.

The acquisition unit 31 acquires the acoustic signals of M channels output by the microphone array 2 and outputs the acquired acoustic signals of M channels to the phase difference information calculator 32.

The phase difference information calculator 32 performs a short-time Fourier transform on the acoustic signals of M channels output by the acquisition unit 31 and converts a time domain into a frequency domain. The phase difference information calculator 32 outputs the acoustic signals converted into the frequency domain to the estimator 33. Note that the acoustic signals converted into the frequency domain include phase information.

The estimator 33 directly inputs phase information output by the phase difference information calculator 32 to a von Mises-Bernoulli deep neural network (hereinafter referred to as a vM-B DNN) to perform sound source localization. The estimator 33 outputs an estimation result to the output unit 34. Note that the vM-B DNN will be described below. In addition, the estimator 33 includes a deep learning machine 331. A configuration of the deep learning machine 331 will be described below using FIG. 2.

The output unit 34 outputs the result of estimation output by the estimator 33 to an external device (for example, a display device, a printing device, a voice recognition device, and the like.) Next, a configuration example of the estimator 33 will be described.

Figure 2:
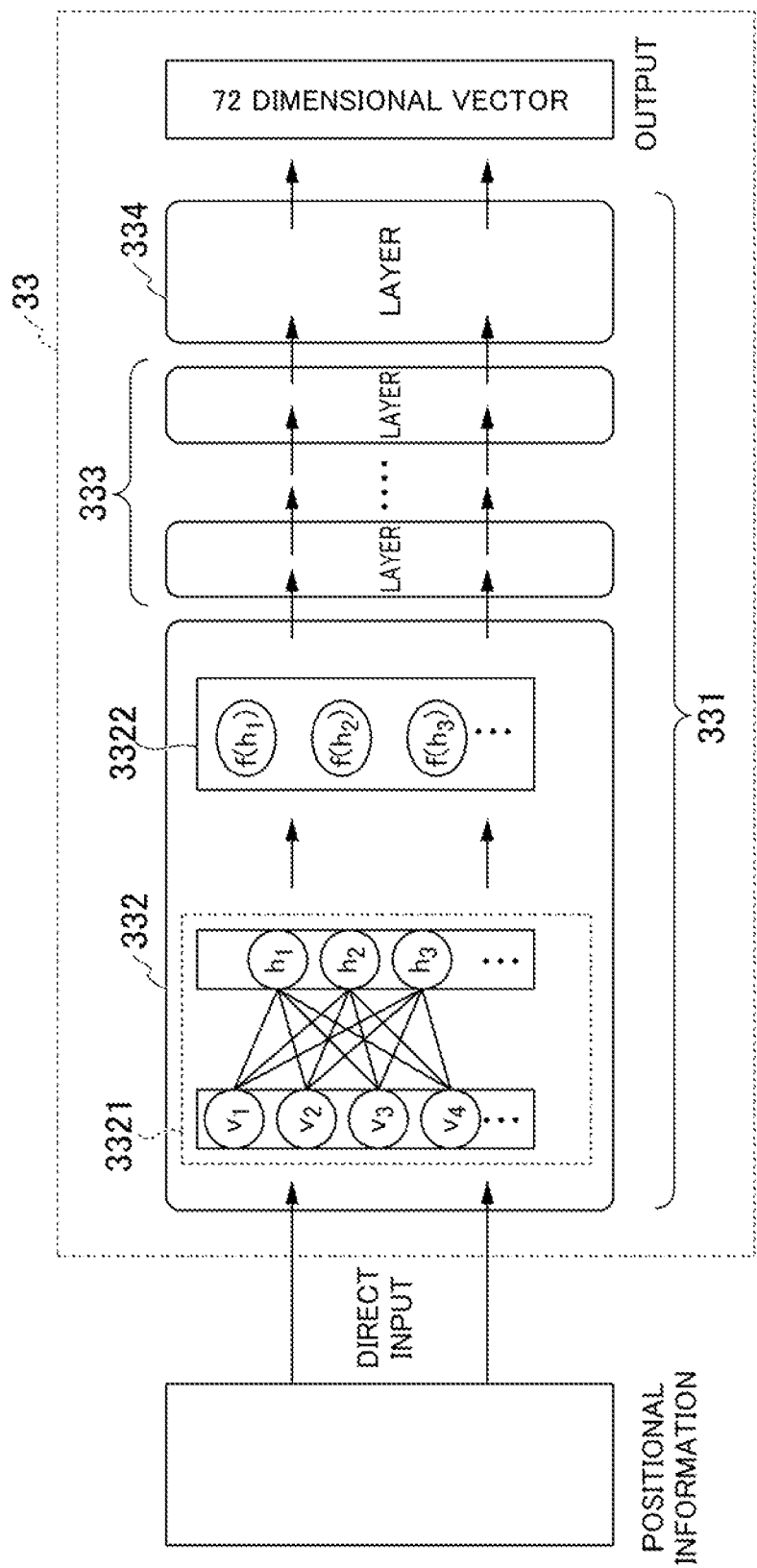
FIG. 2 is a diagram which shows a configuration example of an estimator according to the embodiment.

FIG. 2 is a diagram which shows a configuration example of the estimator according to the embodiment. As shown in FIG. 2, the estimator 33 is configured by a neural network, i.e., a deep learning machine 331. In the present embodiment, the deep learning machine (neural network) 331 is referred to as a vM-B DNN.

The vM-B DNN is a neural network that has been expanded such that a phase can be directly input using a von Mises distribution used for periodic quantities. Note that the example shown in FIG. 2 is an example of a 72 (=360/5) dimensional vector in which output has a sound source direction set at every 5 degrees. In addition, the output indicates the direction of the sound source.

The deep learning machine 331 includes an input layer 332, an intermediate layer 333, and an output layer 334.

In addition, the input layer 332 includes a restricted Boltzmann machine (RBM) 3321 and an activation function 3322. In the deep learning machine 331 included in the estimator 33 of the present embodiment, the activation function 3322 is changed such that phase information can be directly input to a general neural network. Note that the activation function is a non-linear function or an identity function that is applied after linear transformation in a neural network.

The vM-B DNN will be further described.

Calculation of each layer of a feed forward neural network using a sigmoid function that is an activation function is coincident with calculation of a posterior distribution for a hidden layer of the RBM.

For this reason, calculation of a hidden layer of the neural network can be regarded as point estimation of the hidden layer of RBM, that is, calculation of the hidden layer of the neural network and calculation of the hidden layer of the RBM are equivalent to each other. The vM-B DNN uses a method based on this point estimation in consideration of von Mises-Bernoulli restricted Boltzmann machine (vM-B RBM).

Note that, although an example in which a von Mises distribution is introduced into the restricted Boltzmann machine (RBM) in the learning of phase information (periodic information) using the neural network will be described in the following description, the present embodiment is not limited thereto.

The von Mises distribution may be introduced into other learning machines to perform learning of phase information (periodic information).

Figure 3:
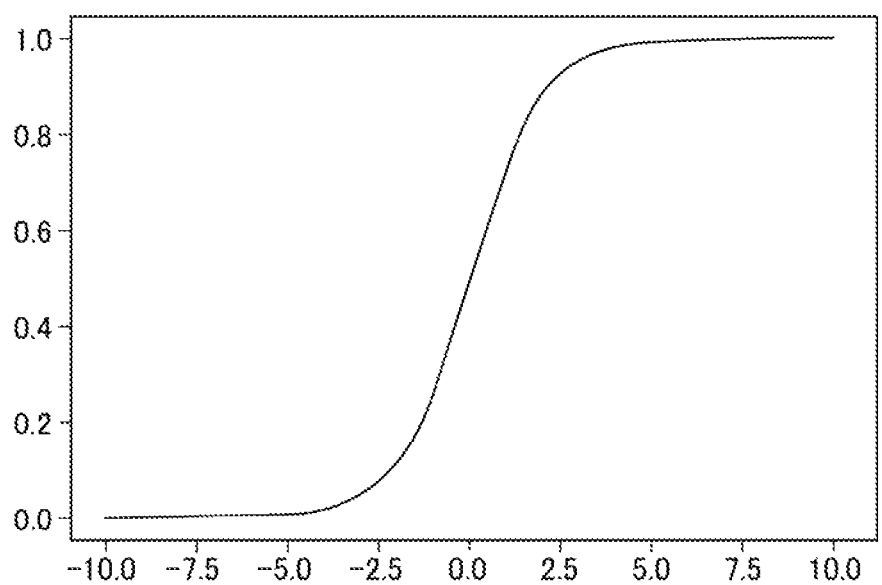
FIG. 3 is a diagram which shows a sigmoid function.

Note that a sigmoid function $\delta(x)$ is expressed by, for example, the following Equation (1) and is expressed as shown in FIG. 3. FIG. 3 is a diagram which shows the sigmoid function $\delta(x)$. In FIG. 3, the horizontal axis is x and the vertical axis is $\delta(x)$.

$$\delta(x) = \frac{1}{1 + \exp(-x)} \quad (1)$$

[Von Mises-Bernoulli RBM]

For this reason, vM-B RBM will be described first.

RBM is a probability model in which a connection of nodes between a visible layer and a hidden layer is restricted. If a state of a node input to the RBM is set as $v \in \{0,1\}^I$, and a state of a node to be output is set as $h \in \{0,1\}^J$, a probability model $P(v,h)$ of the RBM can be defined as shown in the following Equation (2). Here, I is the total number of nodes in a lower layer (input side), and J is the total number of nodes in an upper layer (output side).

$$P(v, h) = -\frac{E(v, h)}{Z} \quad (2)$$

Note that E(v,h) is the following Equation (3) and Z is a normalization constant in Equation (2).

$$E(v,h) = -a^T v - b^T h - v^T W h \quad (3)$$

In Equation (3), a and b are parameters, and W is a network weight parameter and is a value to be learned in the neural network.

At this time, an input conditional probability $P(v_i|h)$ and an output conditional probability $P(h_j|v)$ follow a Bernoulli distribution. Here, i is an index of the nodes in the lower layer (input side) and j is an index of the nodes in the upper layer (output side). For this reason, the RBM defined in Equations (2) and (3) is a Bernoulli-Bernoulli RBM (hereinafter referred to as a B-B RBM).

Moreover, an activation function (a posterior probability of the RBM) $p(h_j=1|v)$ in a normal RBM is expressed using the following Equation (4).

$$p(h_j = 1|v) = \frac{1}{1 + \exp\left(-\left(b_j + \sum_i W_{ij}v_i\right)\right)} = \sigma\left(b_j + \sum_i W_{ij}v_i\right) \quad (4)$$

On the other hand, the vM-B RBM is an RBM in which the input is assumed to follow the von Mises distribution and the output is assumed to follow the Bernoulli distribution and is a special case of an RBM for an exponential distribution. Here, the von Mises distribution $vM(\cdot)$ is a distribution expressed using the following equation (5) using a probability variable $\theta \in \{0, 2\pi\}$.

$$vM(\theta; \mu, \beta) = \frac{\exp(\beta\cos(\theta - \mu))}{2\pi I_0(\beta)} \quad (5)$$

In Equation (5), $\mu$ is an average direction, $\beta$ is a parameter indicating a degree of concentration, and $I_0(\cdot)$ is a first type of modified Bessel function. Note that the first type of modified Bessel function is expressed as in the following Equation (6).

$$I_\alpha(\beta) = \sum_{m=0}^{\infty} \frac{1}{m!\Gamma(m + \alpha + 1)}\left(\frac{\beta}{2}\right)^{2m+\alpha} \quad (6)$$

Note that $\alpha$ is a parameter in Equation (6).

In the vM-B RBM, $E(v,h)$ is defined using the following Equation (7) such that the input conditional probability $P(v_i|h)$ follows the von Mises distribution.

$$E(v, h) = -a^T\cos(v) - b^T\sin(v) - c^T h - (\cos(v)^T W + \sin(v)^T Q)h \quad (7)$$

In Equation (7), $v \in [0,2\pi]^I$ and $h \in [0,2\pi]^J$, a, b, and c are parameters, and W and Q are network weight parameters and a, b, c, W and Q are values to be learned in the neural network.

In addition, the activation function (a posterior probability of the RBM) $P(h_j=1|v)$ in the normal RBM is expressed using the following equation (8).

$$P(h_j = 1 | v) = \frac{P(v, h_j)}{P(v)} = \frac{P(v, h_j)}{P(h_j = 0 | v) + P(h_j = 1 | v)} = \quad (8)$$

$$\frac{\exp\left(a^T\sin v + b^T\cos v + c_j h_j + \sum_i h_j(W_{ij}\sin v_i + Q_{ij}\cos v_i)\right)}{\exp(a^T\sin v + b^T\cos v) + \exp\left(a^T\sin v + b^T\cos v + c_j + \sum_i (W_{ij}\sin v_i + Q_{ij}\cos v_i)\right)} =$$

$$\frac{\exp\left(c_j h_j + \sum_i h_j(W_{ij}\sin v_i + Q_{ij}\cos v_i)\right)}{1 + \exp\left(c_j + \sum_i (W_{ij}\sin v_i + Q_{ij}\cos v_i)\right)} =$$

$$\left(\frac{1}{1 + \exp\left(-\left(c_j + \sum_i (W_{ij}\sin v_i + Q_{ij}\cos v_i)\right)\right)}\right)^{h_j} \times$$

$$\left(1 - \frac{1}{1 + \exp\left(-\left(c_j + \sum_i (W_{ij}\sin v_i + Q_{ij}\cos v_i)\right)\right)}\right)^{1-h_j} =$$

$$p_i^{h_j}(1 - p_i)^{1-h_j}$$

Note that $p_i$ is the following Equation (9) in Equation (8).

$$p_t = \frac{1}{1 + \exp\left(-\left(c_j + \sum_i (W_{ij}\sin v_i + Q_{ij}\cos v_i)\right)\right)} \quad (9)$$

In addition, Equation (9) is expressed as in the following Equation (10) using a sigmoid function $\delta(\cdot)$.

$$p_i = \sigma(c_j + \Sigma_i(W_{ij}\sin v_i + Q_{ij}\cos v_i)) \quad (10)$$

[Construction of Von Mises-Bernoulli DNN]

Since each layer of the DNN can be regarded as a point estimation of the hidden layer of the RBM, calculation of the vM-B DNN is defined in consideration of point estimation of the vM-B RBM in the same manner. An output $P(h_j=1|v)$ of an input layer of the vM-B DNN is defined as in the following Equation (11).

$$p(h_j = 1 | v) = \frac{1}{1 + \exp(-\hat{c}_j)} \quad (11)$$

Note that $\hat{c}j$ is the following Equation (12) in Equation (9). In addition, $\hat{c}j$ represents a jth element of $\hat{c}$.

$$\hat{c}_j = c_j + \sum_i (\cos(v_i)W_{ij} + \sin(v_i)Q_{ij}) \quad (12)$$

Here, Equation (11) is a sigmoid function and the $\hat{c}j$ in Equation (12) is different from the B-B RBM (for example, Equation (1)) described above.

For this reason, an input layer can be implemented by changing $\hat{c}j$ with respect to the neural network in which a sigmoid function is set as an activation function. Note that second and subsequent layers in the vM-B DNN are constructed in the same manner as in the general neural network.

Furthermore, modeling of phase information will be described with reference to FIG. 4.

Figure 4:
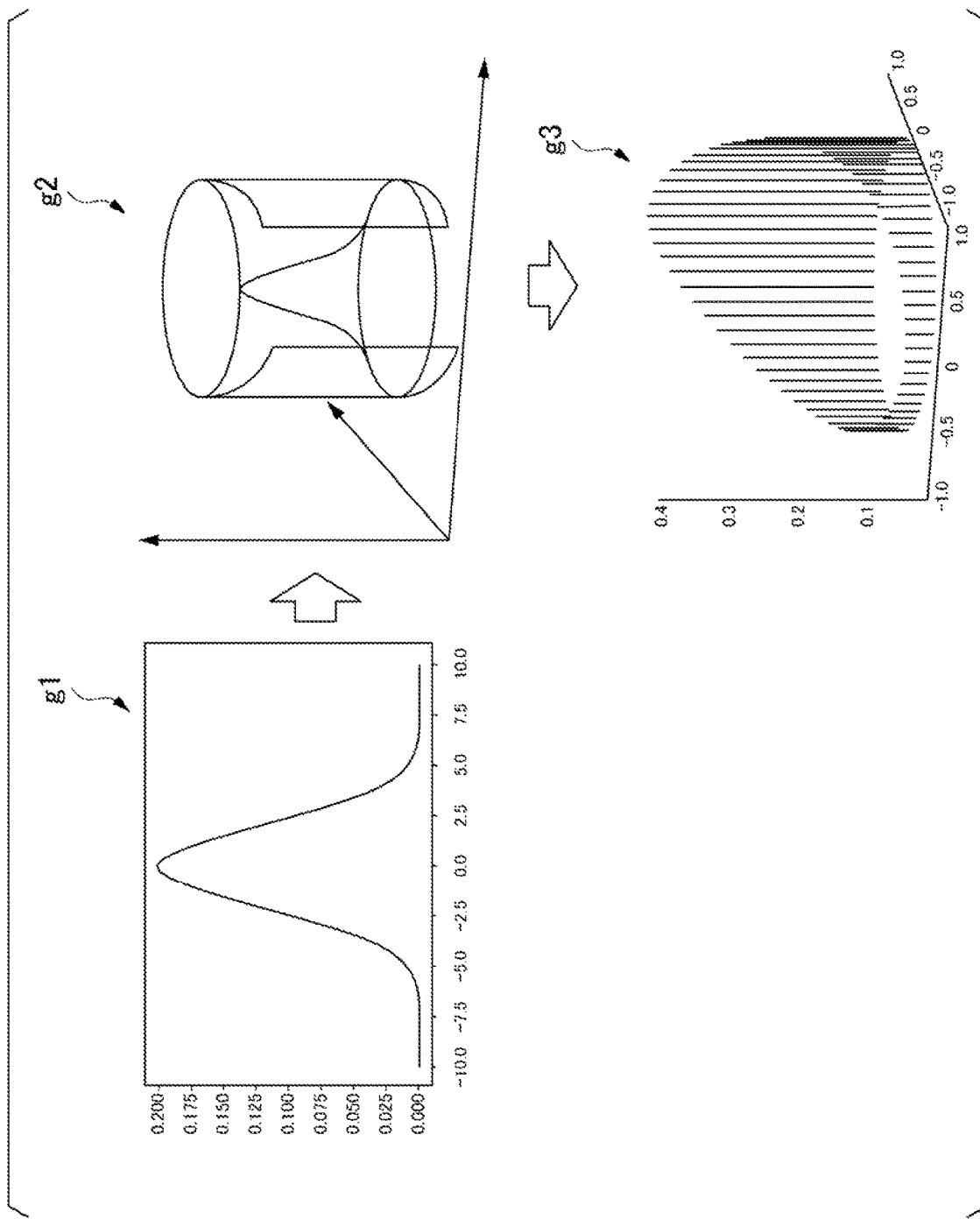
FIG. 4 is a diagram for describing modeling of phase information according to the embodiment.

FIG. 4 is a diagram for describing the modeling of phase information according to the present embodiment. A code g1 represents a general Gaussian distribution. However, when the horizontal axis is phase information, it is a periodic function like a code g2, and thus it is necessary to connect left and right ends at values of 0 and a in FIG. 4. A code g3 represents a von Mises distribution obtained by converting the Gaussian distribution into a Gaussian distribution on the circumference in this manner, and periodic phase information can be handled by using this distribution.

Next, an example of a processing procedure performed by the sound source localization device 3 will be described.

Figure 5:
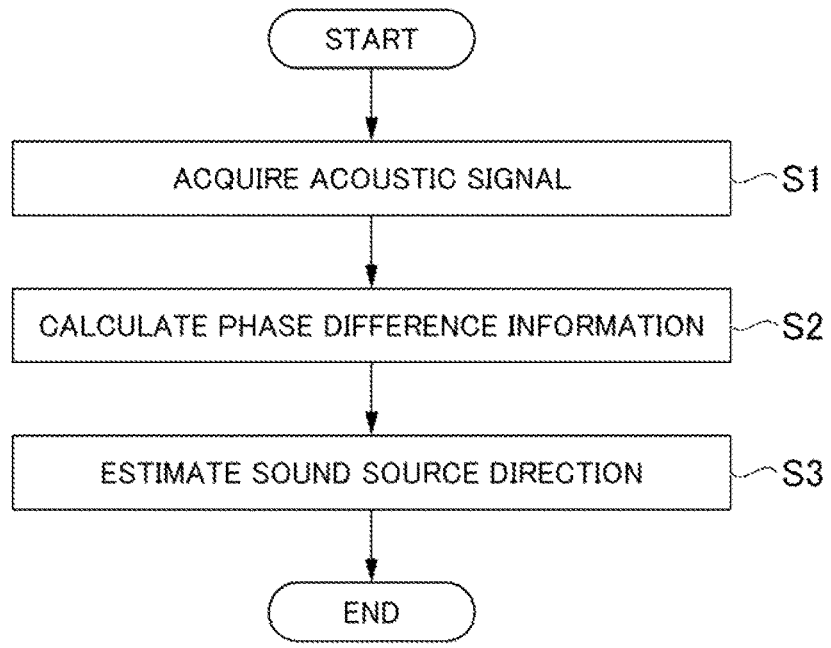
FIG. 5 is a flowchart of a processing procedure performed by the sound source localization device according to the embodiment.

FIG. 5 is a flowchart of the processing procedure performed by the sound source localization device 3 according to the present embodiment.

(Step S1) The acquisition unit 31 acquires the acoustic signals of M channels output by the microphone array 2.

(Step S2) The phase difference information calculator 32 performs the short-time Fourier transform on the acoustic signals of M channels output by the acquisition unit 31 and converts a time domain into a frequency domain.

(Step S3) The estimator 33 directly inputs the phase information output by the phase difference information calculator 32 to the von Mises-Bernoulli deep neural network and performs sound source localization.

[Simulation Result]

Next, a simulation result will be described.

Figure 6:
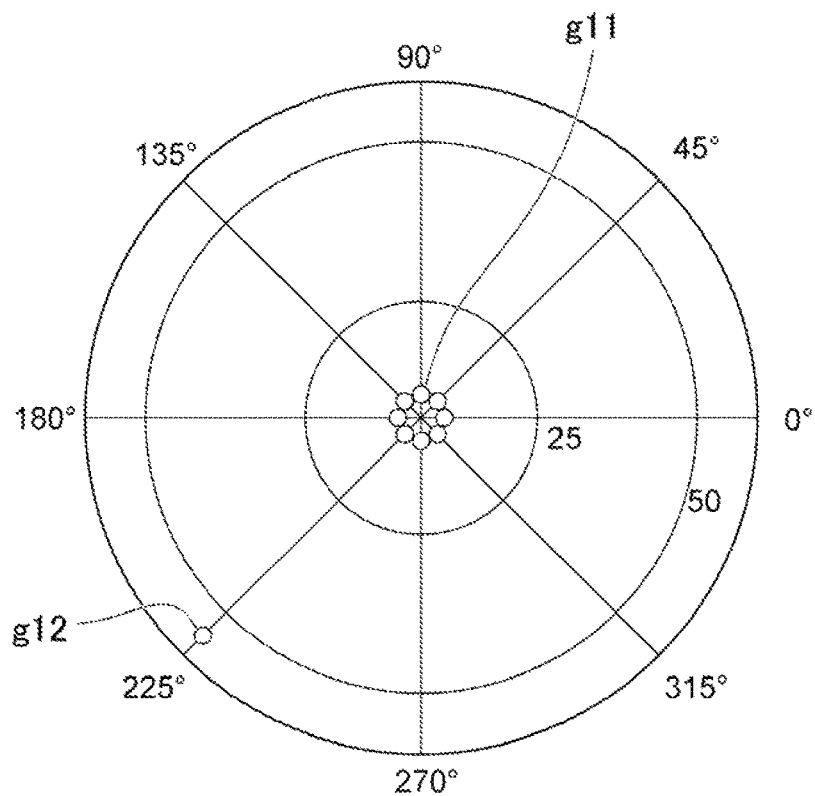
FIG. 6 is a diagram which shows positions of a microphone array and a single fixed sound source in a virtual environment.

FIG. 6 is a diagram which shows positions of a microphone array and a single fixed sound source in a virtual environment. The code g11 indicates a microphone array and the code g12 indicates a sound source. As shown in FIG. 6, the center of the microphone array was set as a reference point. In addition, the microphone array was composed of eight microphones and was arranged at intervals of 45 degrees on a circumference having a radius of 10 [cm]. The distance from the sound source was 0.5 to 1.5 [m]. The sampling frequency of the microphone array with respect to the acoustic signals subjected to sound collection was 16 [kHz]. The signal to noise ratio SNR of the microphone array was 20 [dB]. The frequency band of the sound source was up to 2 [kHz] and was divided into 256 parts. Learning data was 100,000 sets and the test data was 10,000 sets.

In the simulation, a sound was output from a sound source and an acoustic signal in which sound was collected using each microphone was recorded. The phase for each frequency was calculated from the obtained acoustic signal, and this data was defined as one set. In addition, the direction of the sound source was given at every 5 degrees in an answer label. This was performed by changing the arrangement of the sound source and a data set is generated.

Note that a signal output from the sound source was generated according to the following Equation (13).

$$y(t) = \sum_{i=1}^{100} A_i \sin(2\pi f_i t) \quad (13)$$

Figure 7:
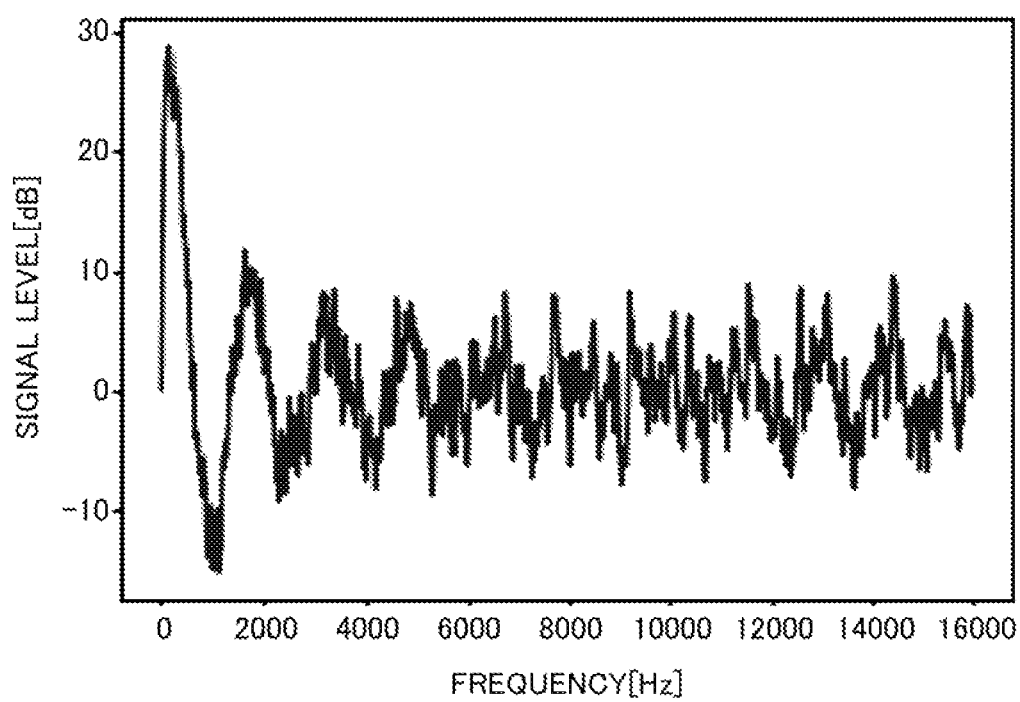
FIG. 7 is a diagram which shows an example of a signal output from a sound source.

However, in Equation (11), $A \in [0,1]$ and $f_i \in [0,2000]$, and both were randomly generated values. FIG. 7 is a diagram which shows an example of a signal output from the sound source. The horizontal axis is frequency [Hz] and the vertical axis is signal level [dB].

Figure 8:
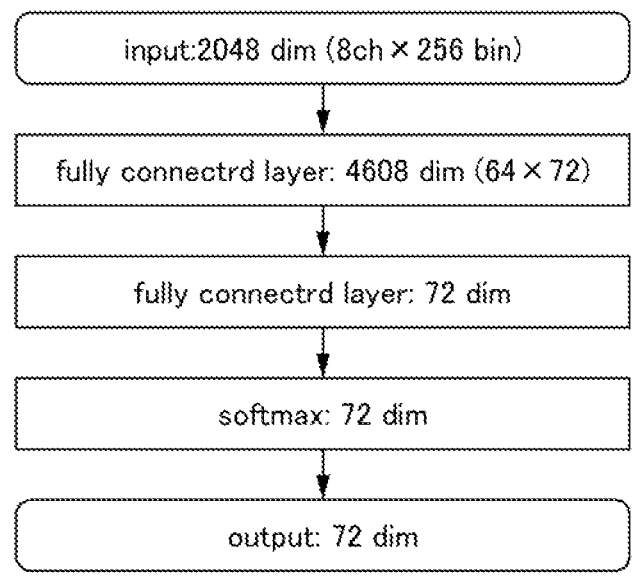
FIG. 8 is a diagram which shows a configuration of a DNN that is a comparison target.
Figure 9:
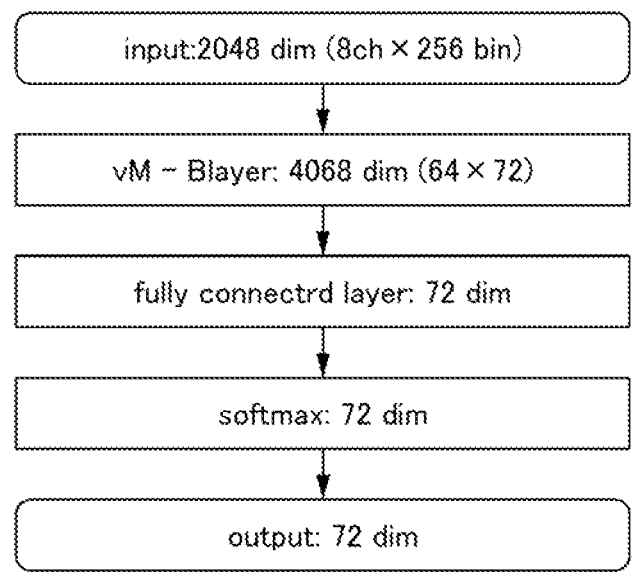
FIG. 9 is a diagram which shows a configuration of a vM-B DNN according to the embodiment.

In addition, a DNN replacing an input layer of a vM-B DNN in full connection using a sigmoid function activation function was set as a comparison target. The configuration of each DNN used for learning is as shown in FIGS. 8 and 9. FIG. 8 is a diagram which shows the configuration of a DNN that was a comparison target. FIG. 9 is a diagram which shows the configuration of a vM-B DNN according to the embodiment. The DNN which was a comparison target had an output and input following the Bernoulli distribution.

As shown in FIGS. 8 and 9, the input to the DNN was 7.8 [Hz] phase data and was 256 bins (15.6 [Hz] phase data, . . . , and 2000 [Hz] phase data)×8 dimensions (8 channels).

In addition, as shown in FIG. 8, a fully connected layer which is a first layer had 4608 dimensions (=64×72) in a DNN of a comparative example.

As shown in FIG. 9, a vM-B layer which is the first layer of the vM-B DNN according to the present embodiment had 4608 dimensions (=64×72).

As shown in FIGS. 8 and 9, a fully connected layer which is a second layer had 72 dimensions.

As shown in FIGS. 8 and 9, the number of dimensions of a soft max function of an output layer was 72.

As shown in FIGS. 8 and 9, the number of output dimensions was 72 at every 5 degrees (=360/5).

Figure 10:
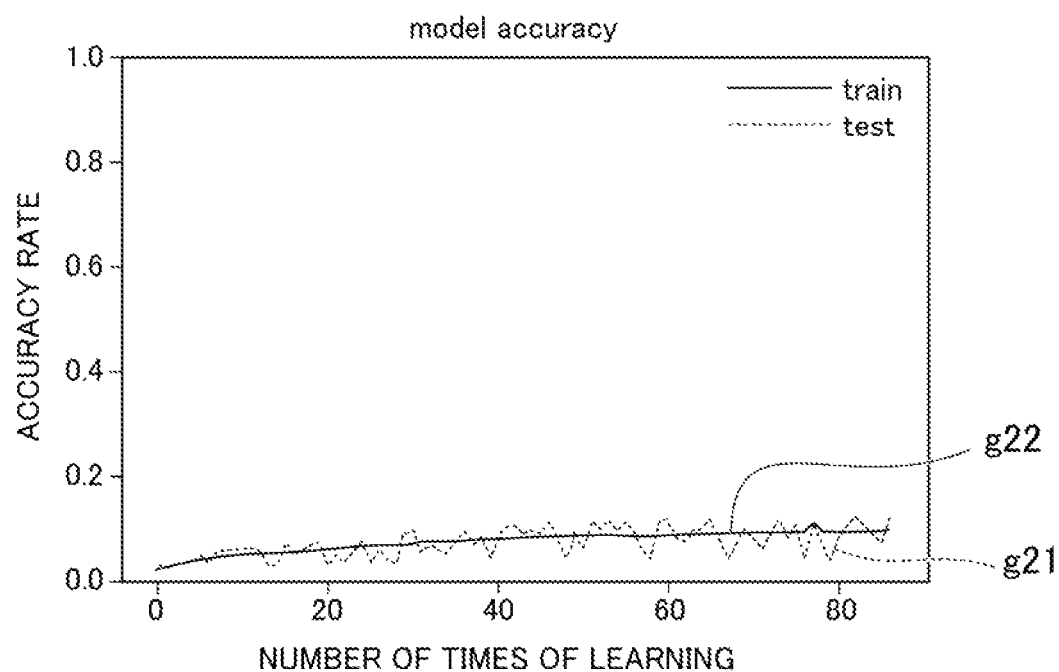
FIG. 10 is a diagram which shows a simulation result of sound source localization using DNN in which input and output used for comparison follow a Bernoulli distribution.
Figure 11:
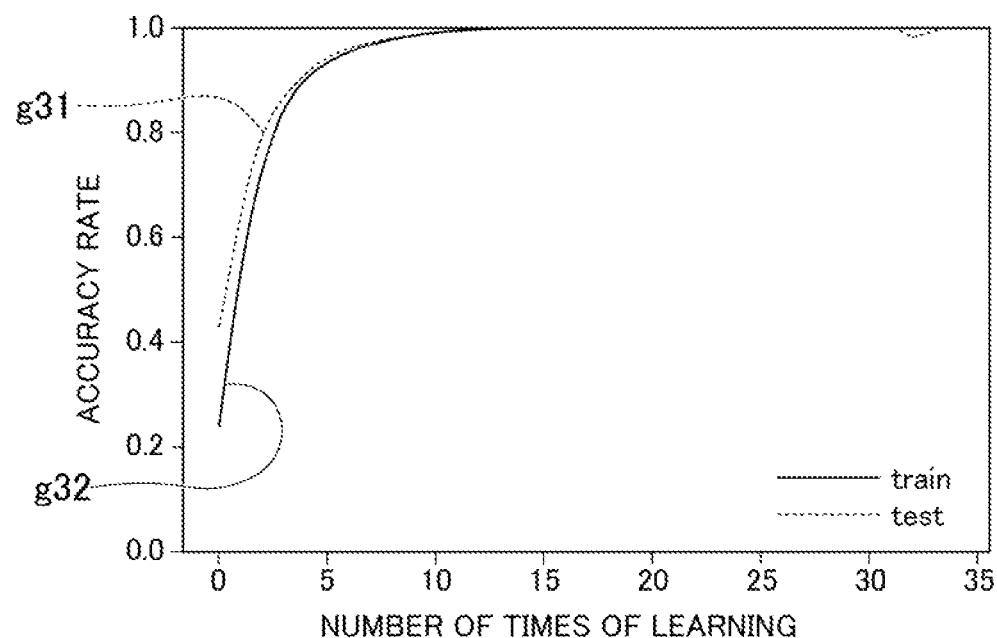
FIG. 11 is a diagram which shows a simulation result of sound source localization using vM-B DNN of the embodiment.
Figure 12:
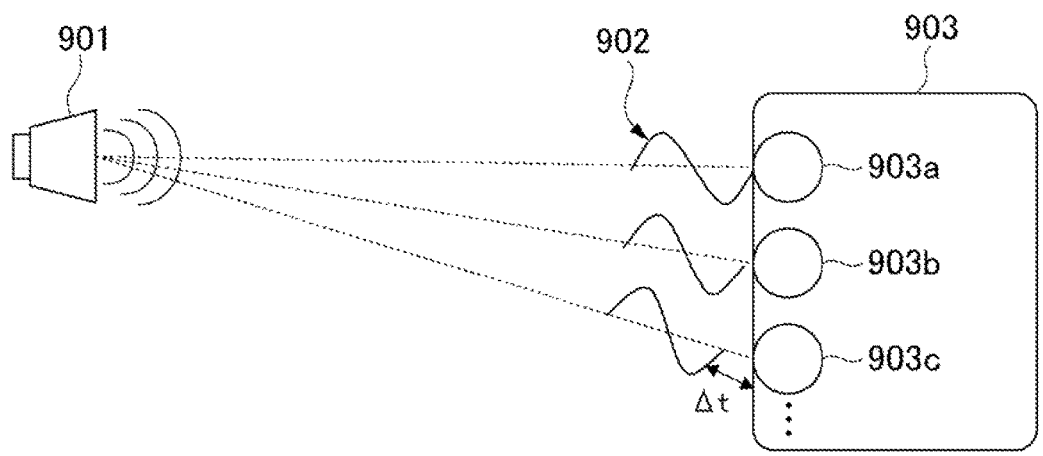
FIG. 12 is a diagram which shows sound collection using a microphone array.
Figure 13:
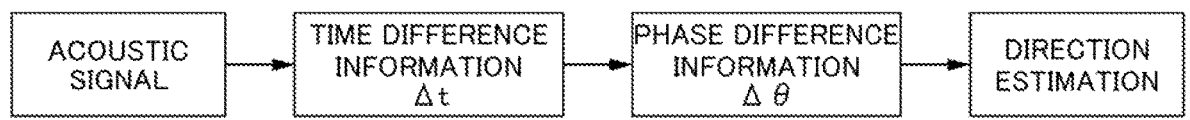
FIG. 13 is a diagram which shows an example of a procedure of general sound source localization processing.
Figure 14:
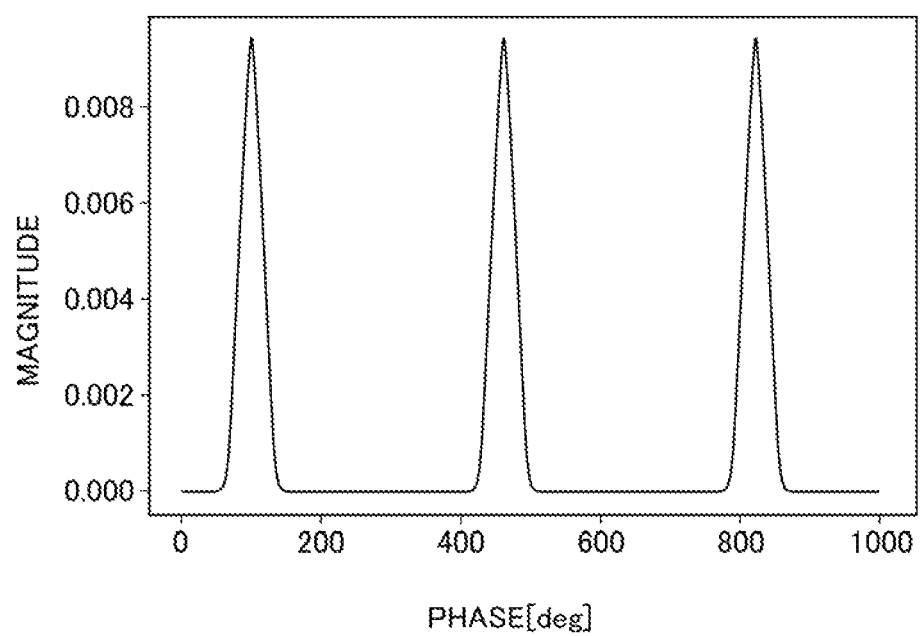
FIG. 14 is a diagram which shows an example of phase difference information.
Figure 15:
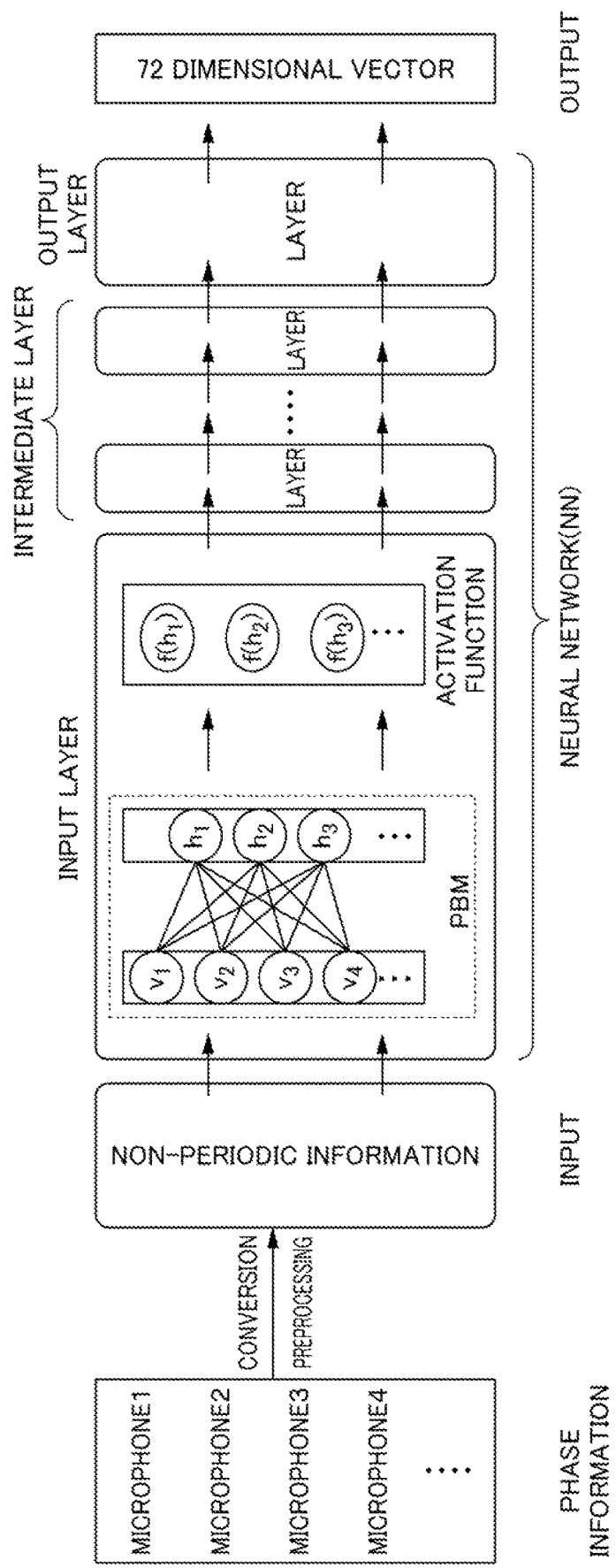
FIG. 15 is a diagram for describing an example of a sound source localization processing technique using a neural network in the prior art.

FIG. 10 is a diagram which shows the simulation result of sound source localization using DNN where input and output used for comparison follows the Bernoulli distribution. FIG. 11 is a diagram which shows the simulation result of sound source localization using the vM-B DNN of the present embodiment.

In FIGS. 10 and 11, the horizontal axis represents the number of times learning was performed, and the vertical axis represents the accuracy rate. Note that the accuracy rate was (the number of data coincident with an answer label)/(the number of test data). Also note that the accuracy rate was defined as a perfect coincidence rate between the direction in which an estimation value in the learning model was maximized and an answer label.

In addition, in FIGS. 10 and 11, the code g21 and the code g31 are simulation results of training data, and the code g22 and the code g32 are simulation results of test data.

As shown in FIG. 10, the accuracy rate of the comparative example was about 0.1 regardless of whether data was training data or test data, or the number of times learning was performed exceeded 20 times.

On the other hand, as shown in FIG. 11, the accuracy rate of the vM-B DNN of the present embodiment reached approximately 1.0 if the number of times learning was performed exceeded 10 times. This simulation result indicates that learning of phase information, i.e., period information, is possible according to the vM-B DNN of the present embodiment. In addition, this simulation result indicates that accurate sound source localization can be realized using the phase information, i.e., period information, according to the vM-B DNN of the present embodiment.

As described above, according to the present embodiment, it is possible to learn phase information that has been difficult to be learned with a conventional DNN model and to realize accurate sound source localization.

An example in which the vM-B DNN is used for sound source localization has been described, however, the present embodiment is not limited thereto. The vM-B DNN of the present embodiment may also be applied to other types of estimation devices or the like that receive periodic information as an input.

[Calculation of Bernoulli-Bernoulli RBM]

Here, it is described that the output conditional probability $P(h_j|y)$ follows the Bernoulli distribution and the input conditional probability $P(v_i|h)$ also follows the Bernoulli distribution in the Bernoulli-Bernoulli RBM.

$E(v,h)$ is expressed using Equation (3) as described above. In addition, a probability model $p(v,h)$ is expressed using the following Equation (14).

$$p(v, h) = \frac{\exp(-E(v, h))}{Z} \quad (14)$$

For this reason, a relationship between the output conditional probability $P(h_j|y)$ and the input conditional probability $P(v_i|h)$ is expressed as in the following Equation (15).

$$P(h_i | v) = \frac{p(v, h_j)}{p(v)} \quad (15)$$

-continued $$= \frac{p(v, h_j)}{p(h_j = 0 \mid v) + p(h_j = 1 \mid v)}$$

$$= \frac{\exp\left(\sum_i a_i v_i + b_j h_j + \sum_i h_j W_{ij} v_i\right)}{\exp\left(\sum_i a_i v_i\right) + \exp\left(\sum_i a_i v_i + b_j + \sum_i W_{ij} v_i\right)}$$

$$= \frac{\exp\left(b_j h_j + \sum_i h_j W_{ij} v_i\right)}{1 + \exp\left(b_j + \sum_i W_{ij} v_i\right)}$$

$$= \left(\frac{1}{1 + \exp\left(-\left(b_j + \sum_i W_{ij} v_i\right)\right)}\right)^{h_j}$$

$$\left(1 - \frac{1}{1 + \exp\left(-\left(b_j + \sum_i W_{ij} v_i\right)\right)}\right)^{1-h_j}$$

However, $p_i$ is the following Equation (16) in Equation (11).

$$p_i \equiv \frac{1}{1 + \exp\left(-\left(b_j + \sum_j W_{ij} v_i\right)\right)} \quad (16)$$

According to Equation (15), the output conditional probability $P(h_j|y)$ follows the Bernoulli distribution. Then, a sigmoid function is obtained when $P(h_j=1|v)$ is pi according to Equation (16). Furthermore, the input conditional probability $P(v_i|h)$ also follows the Bernoulli distribution according to Equation (15).

[Calculation of Von Mises-Bernoulli RBM]

It is described that the input conditional probability $P(v^i|h)$ follows the von Mises distribution and the output conditional probability $P(h_j|y)$ follows the Bernoulli distribution in the von Mises-Bernoulli RBM.

$E(v,h)$ is expressed using the following Equation (17). In addition, the probability model $P(v,h)$ is expressed using the following Equation (18).

$$E(v, h) = -a^T \cos(v) - b^T \sin(v) - c^T h - (\cos(v)^T W + \sin(v)^T Q)h \quad (17)$$

$$P(v, h) = \frac{\exp(-E(v, h))}{Z} \quad (18)$$

For this reason, the input conditional probability $P(v_i|h)$ is expressed as in the following Equation (19). Note that $v \in [0, 2\pi]^I$, $h \in [0, 2\pi]^J$, $a \in RI$ (R is a set of integers), $b \in R^I$, and $a \in R^J$ are biases, $W \in R^{I \times J}$ and $Q \in R^{I \times J}$ are parameters representing connection weights. In addition, $\mu$ is an average direction, $\beta$ is a parameter indicating the degree of concentration, and $I_0(\cdot)$ is the first type of modified Bessel function.

$$P(v_i \mid h) = \frac{P(v_i, h)}{P(h)} = \quad (19)$$

$$\frac{P(v_i, h)}{\int_0^{2\pi} P(v_i, h) dv_i} = \frac{\exp\left(a_i \sin v_i + b_i \cos v_i + c^T h + \sin v_i \sum_j h_j W_{ij} + \cos v_i \sum_j h_j Q_{ij}\right)}{\int_0^{2\pi} \exp\left(a_i \sin v_i + b_i \cos v_i + c^T h + \sin v_i \sum_j h_j W_{ij} + \cos v_i \sum_j h_j Q_{ij}\right) dv_i} =$$

$$\frac{\exp\left(a_i \sin v_i + b_i \cos v_i + \sin v_i \sum_j h_j W_{ij} + \cos v_i \sum_j h_j Q_{ij}\right)}{\int_0^{2\pi} \exp\left(a_i \sin v_i + b_i \cos v_i + \sin v_i \sum_j h_j W_{ij} + \cos v_i \sum_j h_j Q_{ij}\right) dv_i} =$$

$$\frac{\exp\left(\sin v_i \left(a_i + \sum_j h_j W_{ij}\right) + \cos v_i \left(b_i + \sum_j h_j Q_{ij}\right)\right)}{\int_0^{2\pi} \exp\left(\sin v_i \left(a_i + \sum_j h_j W_{ij}\right) + \cos v_i \left(b_i + \sum_j h_j Q_{ij}\right)\right) dv_i} =$$

$$\frac{\exp(\hat{a}_i \sin v_i + \hat{b}_i \cos v_i)}{\int_0^{2\pi} \exp(\hat{a}_i \sin v_i + \hat{b}_i \cos v_i) dv_i} =$$

$$\frac{\exp(\beta_i \cos(v_i - \mu_i))}{\int_0^{2\pi} \exp(\beta_i \cos(v_i - \mu_i)) dv_i} = \frac{\exp(\beta_i \cos(v_i - \mu_i))}{2\pi I_0(\beta_i)} = vM(v_i; \mu_i; \beta_i)$$

In Equation (15), a, b, h, W, $\beta$, and $\mu$ have a relationship of following Equations (20) to (22).

$$\hat{a}_i = a_i + \sum_j h_j W_{ij} \quad (20)$$

-continued $$\hat{b}_i = b_i + \sum_j h_j W_{ij} \quad (21)$$

$$\beta_i \cos(v_i - \mu_i) = \hat{a}_i \sin v_i + \hat{b}_i \cos v_i \quad (22)$$

The input conditional probability $P(v_i|h)$ follows the von Mises distribution according to Equation (19).

Next, the output conditional probability $P(h_j|y)$ is expressed as in the following equation (23). Note that $c_j$ is a value before being input to an activation function (sigmoid function) of nodes in the neural network.

$$P(h_j = 1 | v) = \frac{P(v, h_j)}{P(v)} = \frac{P(v, h_j)}{P(h_j = 0 | v) + P(h_j = 1 | v)} =$$

$$\frac{\exp\left(a^T \sin v + b^T \cos v + c_j h_j + \sum_i h_j(W_{ij} \sin v_i + Q_{ij} \cos v_i)\right)}{\exp(a^T \sin v + b^T \cos v) + \exp\left(a^T \sin v + b^T \cos v + c_j + \sum_i (W_{ij} \sin v_i + Q_{ij} \cos v_i)\right)} =$$

$$\frac{\exp\left(c_j h_j + \sum_i h_j(W_{ij} \sin v_i + Q_{ij} \cos v_i)\right)}{1 + \exp\left(c_j + \sum_i (W_{ij} \sin v_i + Q_{ij} \cos v_i)\right)} =$$

$$\left(\frac{1}{1 + \exp\left(-\left(c_j + \sum_i (W_{ij} \sin v_i + Q_{ij} \cos v_i)\right)\right)}\right)^{h_j} \times$$

$$\left(1 - \frac{1}{1 + \exp\left(-\left(c_j + \sum_i (W_{ij} \sin v_i + Q_{ij} \cos v_i)\right)\right)}\right)^{1-h_j} =$$

$$p_i^{h_j}(1 - p_i)^{1-h_j}$$

However, $p_i$ is the following Equation (24) in Equation (23).

$$p_i = \frac{1}{1 + \exp\left(-\left(c_j + \sum_i (W_{ij} \sin v_i + Q_{ij} \cos v_i)\right)\right)} \quad (24)$$

Equation (24) is expressed as in the following Equation (25) using the sigmoid function.

$$p_i = \sigma(c_j + \Sigma_i(W_{ij} \sin v_i + Q_{ij} \cos v_i)) \quad (25)$$

The output conditional probability $P(h_j|y)$ follows the Bernoulli distribution according to Equation (23). Then, a sigmoid function is obtained when $P(h_j=1|v)$ is $p_i$ according to Equations (24) and (25).

As described above, in the present embodiment, an input is made to handle a von Mises distribution such that the phase information can be directly input to the neural network. That is, in the present embodiment, when both an input and an output of a limited Boltzmann machine (RBM) with one neural network follow the Bernoulli distribution, a probability model is expressed as $P(v,h)=\exp(-E(v,h))/Z$, $E(v,h)=-a^T v - b^T h - v^T Wh(E(v,h))$ is an energy function), and the energy function is defined as $E(v,h)=-a^T \cos(v) - b^T \sin(v) - c^T h - (\cos(v)^T W + \sin(v)^T Q)h$ such that an input corresponds to the von Mises distribution. Then, in the present embodiment, a deep learning machine where input follows the von Mises distribution is used to learn and perform sound source localization by inputting a phase of input speech to the learning machine.

As a result, according to the present embodiment, it is possible to learn phase information and to perform sound source localization using the phase information.

Note that a program for realizing all or some of functions of the sound source localization device 3 in the present invention may be recorded on a computer-readable recording medium, the program recorded on this recording medium may be read and executed by a computer system, and thereby all or part of the processing performed by the sound source localization device 3 may be performed. Note that the "computer system" herein is assumed to include an OS and hardware such as peripheral devices. In addition, it is assumed that a "computer system" may include a WWW system having a website providing environment (or a display environment). In addition, "computer-readable recording medium" refers to a portable device such as a flexible disk, a magneto-optical disc, a ROM, a CD-ROM, or a storage device such as a hard disk embedded in the computer system. Furthermore, it is assumed that the "computer-readable recording medium" may include those holding the program for a certain period of time, like a volatile memory (RAM) inside the computer system, which serves as a server or a client when the program is transmitted via a network such as the Internet or a communication line such as a telephone line.

In addition, the program described above may be transmitted from a computer system which stores this program in a storage device and the like to another computer system via a transmission medium or using a transmission wave in the transmission medium. Here, the "transmission medium" that transmits the program refers to a medium having a function of transmitting information, such as the network (communication network) like the Internet or the communication line such as a telephone line. Moreover, the program described above may be a program for realizing some of the functions described above. Furthermore, it may also be a program that can realize the functions described above in combination with a program already recorded on a computer system, which is a so-called difference file (a difference program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and should only be considered as being limited by the scope of the appended claims.

What is claimed is:

1. A sound source localization device comprising:
 an acquisition unit configured to acquire acoustic signals of M channels, wherein M is an integer equal to or greater than two;
 a phase difference information calculator configured to perform a short-time Fourier transform on the acoustic signals of M channels and to convert a time domain into a frequency domain including phase information; and
 an estimator configured to perform sound source localization of the acoustic signals using a deep learning machine where input follows a von Mises distribution by inputting the phase information of the acoustic signals subjected to the short-time Fourier transform to the deep learning machine,
wherein the deep learning machine is a learning machine in which an energy function of a probability model is defined by the following equation, wherein a, b, and c are parameters, W and Q are network weight parameters, $v \in [0, 2\pi]^I$, $h \in [0, 2]^J$, I is the total number of nodes in a lower layer (input side), J is the total number of nodes in an upper layer (output side), and T is an inversion code, to construct a neural network, a, b, c, W and Q being values to be learned in the neural network:

$$E(v,h) = -a^T \cos(v) - b^T \sin(v)$$

$$-c^T h - (\cos(v)^T W + \sin(v)^T Q)h$$

2. The sound source localization device according to claim 1,
wherein the deep learning machine defines an activation function to which an output of the learning machine is input, which is a posterior probability $P(h_j|v)$ in the learning machine as shown in the following equation, wherein $\sigma(\cdot)$ is a sigmoid function, $$P(h_j = 1 \mid v) = \frac{P(v, h_j)}{P(v)} = \frac{P(v, h_j)}{P(h_j = 0 \mid v) + P(h_j = 1 \mid v)} =$$

$$\frac{\exp\left(a^T \sin v + b^T \cos v + c_j h_j + \sum_i h_j (W_{ij} \sin v_i + Q_{ij} \cos v_i)\right)}{\exp(a^T \sin v + b^T \cos v) + \exp\left(a^T \sin v + b^T \cos v + c_j + \sum_i (W_{ij} \sin v_i + Q_{ij} \cos v_i)\right)} =$$

$$\frac{\exp\left(c_j h_j + \sum_i h_j (W_{ij} \sin v_i + Q_{ij} \cos v_i)\right)}{1 + \exp\left(c_j + \sum_i (W_{ij} \sin v_i + Q_{ij} \cos v_i)\right)} =$$

$$\left(\frac{1}{1 + \exp\left(-\left(c_j + \sum_i (W_{ij} \sin v_i + Q_{ij} \cos v_i)\right)\right)}\right)^{h_j} \times$$

$$\left(1 - \frac{1}{1 + \exp\left(-\left(c_j + \sum_i (W_{ij} \sin v_i + Q_{ij} \cos v_i)\right)\right)}\right)^{1-h_j} =$$

$$p_i^{h_j}(1 - p_i)^{1-h_j}$$

$p_i$ is the following equation in the above equation, and $$p_i = \frac{1}{1 + \exp\left(-\left(c_j + \sum_i (W_{ij} \sin v_i + Q_{ij} \cos v_i)\right)\right)}$$

the above equation is expressed as the following equation using the sigmoid function $$p_i = \sigma(c_j + \Sigma_i(W_{ij} \sin v_i + Q_{ij} \cos v_i))$$

3. A sound source localization device comprising:
an acquisition unit configured to acquire acoustic signals of M channels, wherein M is an integer equal to or greater than two;

a phase difference information calculator configured to perform a short-time Fourier transform on the acoustic signals of M channels and to convert a time domain into a frequency domain including phase information; and
an estimator configured to perform sound source localization of the acoustic signals using a deep learning machine where input follows a von Mises distribution by inputting the phase information of the acoustic signals subjected to the short-time Fourier transform to the deep learning machine,
wherein an output conditional probability $P(h_j|v)$ of the deep learning machine follows a Bernoulli distribution $v \in [0, 2\pi]^I$, $h \in [0, 2\pi]^J$, I is the total number of nodes in a lower layer (input side) and J is the total number of nodes in an upper layer (output side).

4. A sound source localization method comprising:
an acquisition procedure for acquiring, by an acquisition unit, acoustic signals of M channels, wherein M is an integer equal to or greater than two;
a conversion procedure for performing, by a phase difference information calculator, a short-time Fourier transform on the acoustic signals of M channels and converting a time domain into a frequency domain including phase information; and
an estimation procedure for performing, by an estimator, sound source localization of the acoustic signals by inputting the phase information of the acoustic signals subjected to the short-time Fourier transform to a deep learning machine using the deep learning machine where input follows a von Mises distribution,
wherein the deep learning machine is a learning machine in which an energy function of a probability model is defined by the following equation, wherein a, b, and c are parameters, W and Q are network weight parameters, $v \in [0, 2\pi]^I$, $h \in [0, 2\pi]^J$, I is the total number of nodes in a lower layer (input side), J is the total number of nodes in an upper layer (output side), and T is an inversion code, to construct a neural network, a, b, c, W and Q being values to be learned in the neural network:

$$E(v,h) = -a^T \cos(v) - b^T \sin(v)$$

$$-c^T h - (\cos(v)^T W + \sin(v)^T Q)h.$$

5. A computer-readable non-temporary storage medium storing a program which causes a computer of a sound source localization device to execute:
an acquisition procedure for acquiring acoustic signals of M channels, wherein M is an integer equal to or greater than two;
a conversion procedure for performing a short-time Fourier transform on the acoustic signals of M channels and converting a time domain into a frequency domain including phase information; and
an estimation procedure for performing sound source localization of the acoustic signals by inputting the phase information of the acoustic signals subjected to the short-time Fourier transform to a deep learning machine using the deep learning machine where input follows a von Mises distribution,
wherein the deep learning machine is a learning machine in which an energy function of a probability model is defined by the following equation, wherein a, b, and c are parameters, W and Q are network weight parameters, $v \in [0, 2\pi]^I$, $h \in [0, 2\pi]^J$, I is the total number of nodes in a lower layer (input side), J is the total number of nodes in an upper layer (output side), and T is an inversion code, to construct a neural network, a, b, c, W and Q being values to be learned in the neural network:

$$E(v,h) = -a^T \cos(v) - b^T \sin(v)$$

$$-c^T h - (\cos(v)^T W + \sin(v)^T Q) h.$$

\* \* \* \* \*